US009330401B2

(12) United States Patent
Terrell, II

(10) Patent No.: US 9,330,401 B2
(45) Date of Patent: May 3, 2016

(54) VALIDATION OF MOBILE ADVERTISING FROM DERIVED INFORMATION

(71) Applicant: Amazon Technologies, Inc., Seattle, WA (US)

(72) Inventor: James Richard Terrell, II, Charlotte, NC (US)

(73) Assignee: Amazon Technologies, Inc., Seattle, WA (US)

(*) Notice: Subject to any disclaimer, the term of this patent is extended or adjusted under 35 U.S.C. 154(b) by 134 days.

(21) Appl. No.: 14/081,983

(22) Filed: Nov. 15, 2013

(65) Prior Publication Data
US 2014/0180823 A1     Jun. 26, 2014

Related U.S. Application Data

(63) Continuation of application No. 12/344,313, filed on Dec. 26, 2008, now Pat. No. 8,611,871.

(60) Provisional application No. 61/016,586, filed on Dec. 25, 2007, provisional application No. 61/021,341, filed on Jan. 16, 2008, provisional application No. 61/034,815, filed on Mar. 7, 2008.

(51) Int. Cl.
*G06Q 30/02*     (2012.01)
*H04M 3/487*     (2006.01)

(52) U.S. Cl.
CPC ............ *G06Q 30/0267* (2013.01); *G06Q 30/02* (2013.01); *G06Q 30/0248* (2013.01);
(Continued)

(58) Field of Classification Search
CPC .......... H04M 3/4878; H04M 2207/18; H04M 2242/30; H04M 2203/2083
USPC ...................... 455/414.1, 414.2, 456.1, 456.3
See application file for complete search history.

(56) References Cited

U.S. PATENT DOCUMENTS 5,675,507 A    10/1997    Bobo, II
5,974,413 A    10/1999    Beauregard et al.
(Continued)

FOREIGN PATENT DOCUMENTS

EP         1274222 A2     1/2003
WO    WO 2006101528 A1    9/2006

OTHER PUBLICATIONS

David H. Kemsley, et al., A Survey of Neural Network Research and Fielded Applications, 1992, in International Journal of Neural Networks: Research and Applications, vol. 2, No. 2/3/4, pp. 123-133. Accessed on Oct. 25, 2007 athttp://citeseer.ist.psu.edu/cache/papers/cs/25638/ftp:zSzzSzaxon.cs.byu.eduzSzpubzSzpaperszSzkemsley_92.pdf/kemsley92survey.pdf, 12pages total.

(Continued)

*Primary Examiner* — Sam Bhattacharya
(74) *Attorney, Agent, or Firm* — Knobbe, Martens, Olson & Bear, LLP

(57)    ABSTRACT

A system and method of validating an advertisement presented to an advertisement recipient via a mobile communication device includes presenting an advertisement for a product or service to a recipient via a mobile communication device, monitoring the geospatial location of the mobile communication device relative to some predetermined criteria, and inferring information about the reaction of the advertisement recipient to the advertisement on the basis of the monitored geospatial location information.

25 Claims, 6 Drawing Sheets

(52) U.S. Cl.
CPC .... *H04M3/4878* (2013.01); *H04M 2203/2083* (2013.01); *H04M 2207/18* (2013.01); *H04M 2242/30* (2013.01)

(56) References Cited

U.S. PATENT DOCUMENTS

| | | | |
|---|---|---|---|
| 6,173,259 | B1 | 1/2001 | Bijl et al. |
| 6,219,638 | B1 | 4/2001 | Padmanabhan et al. |
| 6,490,561 | B1 | 12/2002 | Wilson et al. |
| 6,532,446 | B1 | 3/2003 | King |
| 6,654,448 | B1 | 11/2003 | Agraharam et al. |
| 6,687,339 | B2 | 2/2004 | Martin |
| 6,687,689 | B1 | 2/2004 | Fung et al. |
| 6,775,360 | B2 | 8/2004 | Davidson et al. |
| 6,816,578 | B1 | 11/2004 | Kredo et al. |
| 6,820,055 | B2 | 11/2004 | Saindon et al. |
| 6,895,084 | B1 | 5/2005 | Saylor et al. |
| 7,200,555 | B1 | 4/2007 | Ballard et al. |
| 7,206,932 | B1 | 4/2007 | Kirchhoff |
| 7,225,224 | B2 | 5/2007 | Nakamura |
| 7,233,655 | B2 | 6/2007 | Gailey et al. |
| 7,236,580 | B1 | 6/2007 | Sarkar et al. |
| 7,254,384 | B2 | 8/2007 | Gailey et al. |
| 7,302,280 | B2 | 11/2007 | Hinckley et al. |
| 2002/0052781 | A1 | 5/2002 | Aufricht et al. |
| 2002/0165773 | A1 | 11/2002 | Natsuno et al. |
| 2003/0008661 | A1 | 1/2003 | Joyce et al. |
| 2003/0050778 | A1 | 3/2003 | Nguyen et al. |
| 2003/0126216 | A1 | 7/2003 | Avila et al. |
| 2004/0005877 | A1 | 1/2004 | Vaananen |
| 2004/0015547 | A1 | 1/2004 | Griffin et al. |
| 2004/0133655 | A1 | 7/2004 | Yen et al. |
| 2005/0010641 | A1 | 1/2005 | Staack |
| 2005/0021344 | A1 | 1/2005 | Davis et al. |
| 2005/0080786 | A1 | 4/2005 | Fish et al. |
| 2005/0101355 | A1 | 5/2005 | Hon et al. |
| 2005/0197145 | A1 | 9/2005 | Chae et al. |
| 2005/0239495 | A1 | 10/2005 | Bayne |
| 2005/0288926 | A1 | 12/2005 | Benco et al. |
| 2006/0052127 | A1 | 3/2006 | Wolter |
| 2007/0061300 | A1 | 3/2007 | Ramer et al. |
| 2007/0115845 | A1 | 5/2007 | Hochwarth et al. |
| 2007/0118426 | A1 | 5/2007 | Barnes, Jr. |
| 2007/0118592 | A1 | 5/2007 | Bachenberg |
| 2007/0180718 | A1 | 8/2007 | Fourquin et al. |
| 2007/0239837 | A1 | 10/2007 | Jablokov et al. |
| 2007/0255794 | A1 | 11/2007 | Coutts |
| 2008/0155060 | A1 | 6/2008 | Weber et al. |
| 2008/0172781 | A1 | 7/2008 | Popowich et al. |
| 2008/0195588 | A1 | 8/2008 | Kim et al. |
| 2008/0261564 | A1 | 10/2008 | Logan |
| 2008/0275864 | A1 | 11/2008 | Kim et al. |
| 2008/0275873 | A1 | 11/2008 | Bosarge et al. |
| 2009/0043855 | A1 | 2/2009 | Bookstaff et al. |
| 2009/0055175 | A1 | 2/2009 | Terrell, II et al. |
| 2009/0076917 | A1 | 3/2009 | Jablokov et al. |
| 2009/0083032 | A1 | 3/2009 | Jablokov et al. |
| 2009/0124272 | A1 | 5/2009 | White et al. |
| 2009/0141875 | A1 | 6/2009 | Demmitt et al. |
| 2009/0182560 | A1 | 7/2009 | White |
| 2009/0228274 | A1 | 9/2009 | Terrell, II et al. |
| 2009/0240488 | A1 | 9/2009 | White et al. |
| 2009/0248415 | A1 | 10/2009 | Jablokov et al. |
| 2010/0049525 | A1 | 2/2010 | Paden |
| 2010/0058200 | A1 | 3/2010 | Jablokov et al. |
| 2010/0279667 | A1 | 11/2010 | Wehrs et al. |
| 2010/0293242 | A1 | 11/2010 | Buchheit et al. |
| 2011/0161276 | A1 | 6/2011 | Krumm et al. |

OTHER PUBLICATIONS

Transl8it! translation engine, publicly available on http://www.transl8it.com since May 30, 2002. Retrieved on Oct. 26, 2007, 6 pages total.

vBulletin Community Forum, thread posted on Mar. 5, 2004. Page retrieved on Oct. 26, 2007 from http://www.vbulletin.com/forum/showthread.php'it-Pov'Zc, 1 page total.

J2EE Application Overview, publicly available on http://www/orionserver.com|docs/j2eeoverview.html since Mar. 1, 2001. Retrieved on Oct. 26, 2007, 3 pages total.

Web-based Telephony Bridges for the Deaf, Glaser et al., 5 pages total.

SoftBridge: An Architecture for Building IP-based Bridges over the Digital Divide, Lewis et al., 5 pages total.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Fielding, et al., Hypertext Transfer Protocol—HTTPl 1.1, RFC 2616, Network Working Group, sections 7,9.5, 14.30, 12 pages total.

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions/ on Jul. 25, 2008, 7 pages total.

Information Disclosure Statement (IDS) Letter Regarding Common Patent Application(s), submitted by Applicant on Jul. 23, 2009.

Information Disclosure Statement (IDS) Letter Regarding Common Patent Applicant(s) Dated, Jun. 4, 2010.

Information Disclosure Statement (IDS) Letter Regarding Common Patent Applicant(s) dated, Jul. 21, 2011.

VALIDATION OF MOBILE ADVERTISING FROM DERIVED INFORMATION

CROSS-REFERENCE TO RELATED APPLICATIONS

This application is a continuation of U.S. patent application Ser. No. 12/344,313, entitled VALIDATION OF MOBILE ADVERTISING FROM DERIVED INFORMATION, and filed Dec. 26, 2008, now U.S. Pat. No. 8,611,871, which claims the benefit of U.S. Provisional Patent Application No. 61/016,586, entitled VALIDATION OF MOBILE ADVERTISING FROM DERIVED INFORMATION, and filed Dec. 25, 2007; U.S. Provisional Patent Application No. 61/021,341, entitled CONTINUOUS SPEECH TRANSCRIPTION UTTERANCE EMPHASIS AND SILENCE INDICATION, and filed Jan. 16, 2008; and U.S. Provisional Patent Application No. 61/034,815, entitled USE OF INTERMEDIATE SPEECH TRANSCRIPTION RESULTS IN EDITING FINAL SPEECH TRANSCRIPTION RESULTS, and filed Mar. 7, 2008, each of which is incorporated herein in its entirety.

In addition, the disclosures of each of the following patent applications, and any corresponding patent application publications thereof, are incorporated herein by reference:

(a) U.S. nonprovisional patent application Ser. No. 11/697,074, filed Apr. 5, 2007, which '074 application published as U.S. patent application publication number US 2007/0239837;

(b) U.S. nonprovisional patent application Ser. No. 12/197,227, filed Aug. 22, 2008;

(c) U.S. nonprovisional patent application Ser. No. 12/198,116, filed Aug. 25, 2008, which application is a continuation-in-part of U.S. nonprovisional patent application Ser. No. 12/197,213, filed Aug. 22, 2008;

(d) U.S. nonprovisional patent application Ser. No. 12/198,112, filed Aug. 25, 2008;

(e) U.S. nonprovisional patent application Ser. No. 12/212,644, filed Sep. 17, 2008; and (f) U.S. nonprovisional patent application Ser. No. 12/212,645, filed Sep. 17, 2008.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to estimating the effectiveness of advertisements delivered by mobile communication device, and, in particular, to the use of a locational tracking system to monitor the movement of a mobile communication device after an advertisement has been downloaded and displayed to a user of the device.

2. Background

As rich feature set mobile communication devices, such as modern cellular telephones and other mobile phones, have gained in popularity, they have increasingly become an advertising medium. As with any advertising medium, it is often desirable to know the effectiveness of advertisements disseminated via mobile communication device. For example, advertisers prefer to know how effective an ad is likely to be before agreeing to pay the cost of an advertisement, and advertising distributors prefer to know how effective an ad is likely to be in order to set the price of the advertisement.

Advertisers and advertisement distributors alike also prefer to target advertisements at particular consumers. For example, local advertisers frequently prefer to target local consumers, and have little interest in targeting consumers that are too geographically distant to be interested in the advertised products or services.

Not surprisingly, as it has recently become more common to provide the ability to determine or track the location of various mobile communication devices such as through the use of conventional Global Positioning System ("GPS") technology, the use of geospatially-targeted advertising campaigns for mobile communication devices has become feasible. In other words, a user of a mobile communication device may now be targeted with advertisements based on the locality of the mobile communication device. However, little has been developed in the way of validation techniques, whereby the effectiveness of advertisements delivered via mobile communication device is measured or otherwise determined, for such advertising. While a user's response to an advertisement can still be judged by monitoring whether they browse to an advertiser's web link (a "click-thru"), many mobile users will simply get the information they need directly from an advertisement (location, time, etc.) and travel to that location. In such a situation, and in many others, it can be quite difficult to correlate the effectiveness or ineffectiveness of the advertisement with the user's actions.

Thus, a need exists for techniques, particularly based on geospatial information pertaining to the location of the mobile communication device, for the validation of mobile advertising.

SUMMARY OF THE PRESENT INVENTION

The present invention comprises, at least, a "mobile walk-thru" system that can be used to validate the effectiveness of mobile advertising campaigns by determining if a user physically visits an advertised location or takes other actions in response to the presentation of an advertisement on the user's mobile communication device. For example, after an advertisement is presented on a mobile handset, the handset's geographical location can be monitored to determine if the user responded to the ad by traveling to a location corresponding to an advertisement, or chose/interacted with a competing option.

Broadly defined, the present invention according to one aspect is a method of validating an advertisement presented to a user via a mobile communication device, including: presenting an advertisement for a product or service to an advertisement recipient via a mobile communication device; for some duration thereafter, monitoring the geospatial location of the mobile communication device relative to a predetermined criteria; and inferring information about the reaction of the advertisement recipient to the advertisement on the basis of the monitored geospatial location information.

In a feature of this aspect, the step of monitoring includes determining whether the mobile communication device traveled to a geospatial location corresponding to the product or service of the presented advertisement.

In another feature of this aspect, the step of monitoring includes determining whether the mobile communication device traveled toward, but did not reach, a geospatial location corresponding to the product or service of the presented advertisement.

In another feature of this aspect, the step of monitoring includes determining whether the mobile communication device traveled to a geospatial location corresponding to a product or service that competes with the product or service of the presented advertisement. In further features, the competing product or service is of the same type as the product or service of the presented advertisement; and the product or service of the presented advertisement and the competing product or service may each be a different fast food restaurant. In further features, the competing product or service is of a different type as the product or service of the presented advertisement; and the product or service of the presented advertisement is a fast food restaurant and the competing product or service is a sit-down family restaurant, or the product or service of the presented advertisement is a concert and the competing product or service is a movie theater, or the product or service of the presented advertisement is a concert and the competing product or service is a restaurant.

In another feature of this aspect, the method further includes: for some duration after presenting the advertisement, monitoring at least a portion of the interaction of the advertisement recipient with the mobile communication device relative to some predetermined criteria; and inferring information about the reaction of the advertisement recipient to the advertisement on the basis of the monitored recipient interaction information. In further features, the step of monitoring includes determining whether the advertisement recipient selects the advertisement to be stored in an ad cache, and the step of monitoring includes determining how long the advertisement is stored in the ad cache and/or the method further includes the step of prompting the advertisement recipient, upon deletion of the advertisement from the ad cache, to indicate whether the advertisement was used or acted upon, wherein the step of monitoring includes monitoring the response of the advertisement recipient to the prompting.

In another further feature, the method also includes, prior to and as a condition to the step of monitoring at least a portion of the interaction, determining whether geospatial location information is available for the mobile communication device, wherein the interaction monitoring step is executed only if the geospatial location of the mobile communication device is determined, while in another further feature, the method also includes, prior to and as a condition to the step of monitoring at least a portion of the interaction, determining whether geospatial location information is available for the mobile communication device, wherein the interaction monitoring step is executed only if the geospatial location of the mobile communication device is not determined.

In other further features, the monitoring step includes monitoring the interaction of the advertisement recipient with the mobile communication device relative to time; the monitoring step includes monitoring the interaction of the advertisement recipient with the mobile communication device relative to the geospatial location of the mobile communication device; and/or the method also includes the step of prompting the advertisement recipient, after a predetermined period of time, to indicate whether the advertisement was used or acted upon, wherein the step of monitoring includes monitoring the response of the advertisement recipient to the prompting.

In another further feature, the inferring step includes inferring that the advertisement recipient utilized a product or service in response to observing the advertisement presented via the mobile communication device. In still further features, the advertisement pertains to a movie currently showing in a local movie theater, wherein the monitoring step includes determining whether the advertisement recipient powers off the mobile communication device, or mutes a ringer of the mobile communication device, for a period of time corresponding in length to the length of the movie showing in the local theater, and the inferring step includes inferring that the advertisement recipient attended the showing.

In another further feature, the monitoring step includes monitoring whether the mobile communication device is used to call a telephone number and determining whether the telephone number call is related to the advertisement presented to the advertisement recipient via the mobile communication device.

In another further feature, the method also includes, upon a determination that the advertisement recipient displayed interest in the advertised product or service, the step of presenting, to the advertisement recipient, one or more questions or prompts to receive additional information, from the advertisement recipient, related to the advertisement. In still further features, the method also includes the step of logging input received from the advertisement recipient in response to the one or more questions or prompts; and the method also includes the step of utilizing the logged input to take one or more of the following actions: audit ad effectiveness, set pricing, or trigger enhanced billing.

Broadly defined, the present invention according to another aspect is a system for validating an advertisement presented to a user via a mobile communication device, including: a mobile communication device; an advertising management server; and software installed in the mobile communication device and the advertising management server for causing a mobile communication device and/or an advertising management server to perform an advertisement validation function including: presenting an advertisement for a product or service to an advertisement recipient via a mobile communication device, for some duration thereafter, monitoring the geospatial location of the mobile communication device relative to a predetermined criteria, and inferring information about the reaction of the advertisement recipient to the advertisement on the basis of the monitored geospatial location information.

Broadly defined, the present invention according to another aspect is software stored on a computer readable medium for causing a mobile communication device and/or an advertising management server to perform an advertisement validation function including: presenting an advertisement for a product or service to an advertisement recipient via a mobile communication device; for some duration thereafter, monitoring the geospatial location of the mobile communication device relative to a predetermined criteria; and inferring information about the reaction of the advertisement recipient to the advertisement on the basis of the monitored geospatial location information.

Broadly defined, the present invention according to another aspect is a method of validating an advertisement presented to the advertisement recipient via a mobile communication device, including: presenting an advertisement for a product or service to an advertisement recipient via a mobile communication device; for some duration thereafter, monitoring at least a portion of the interaction of the advertisement recipient with the mobile communication device relative to some predetermined criteria; and inferring information about the reaction of the advertisement recipient to the advertisement on the basis of the monitored recipient interaction information.

In a feature of this aspect, the step of monitoring includes determining whether the advertisement recipient selects the advertisement to be stored in an ad cache. In further features, the step of monitoring includes determining how long the advertisement is stored in the ad cache; and the method further includes the step of prompting the advertisement recipient, upon manual deletion of the advertisement from the ad cache, to indicate whether the advertisement was used or acted upon, wherein the step of monitoring includes monitoring the response of the advertisement recipient to the prompting, and/or the method further includes the step of prompting the advertisement recipient, in conjunction with automated deletion of the advertisement from the ad cache, to indicate whether the advertisement was used or acted upon, wherein the step of monitoring includes monitoring the response of the advertisement recipient to the prompting.

In another feature of this aspect, the method also includes, prior to and as a condition to the step of monitoring at least a portion of the interaction, determining whether geospatial location information is available for the mobile communication device, wherein the interaction monitoring step is executed only if the geospatial location of the mobile communication device is determined, while in another feature of this aspect, the method also includes, prior to and as a condition to step the step of monitoring at least a portion of the interaction, determining whether geospatial location information is available for the mobile communication device, wherein the interaction monitoring step is executed only if the geospatial location of the mobile communication device is not determined.

In other features of this aspect, the monitoring step includes monitoring the interaction of the advertisement recipient with the mobile communication device relative to time; the monitoring step includes monitoring the interaction of the advertisement recipient with the mobile communication device relative to the geospatial location of the mobile communication device; and/or the method further includes the step of prompting the advertisement recipient, after a predetermined period of time, to indicate whether the advertisement was used or acted upon, wherein the step of monitoring includes monitoring the response of the advertisement recipient to the prompting In another feature of this aspect, the inferring step includes inferring that the advertisement recipient utilized a product or service in response to observing the advertisement presented via the mobile communication device. In further features, the advertisement pertains to a movie currently showing in a local movie theater, wherein the monitoring step includes determining whether the advertisement recipient powers off the mobile communication device, or mutes a ringer of the mobile communication device, for a period of time corresponding in length to the length of the movie showing in the local theater, and the inferring step includes inferring that the advertisement recipient attended the showing.

In another feature of this aspect, the monitoring step includes monitoring whether the mobile communication device is used to call a telephone number and determining whether the telephone number call is related to the advertisement presented to the advertisement recipient via the mobile communication device.

In another feature of this aspect, the method further includes, upon a determination that the advertisement recipient displayed interest in the advertised product or service, the step of: presenting, to the advertisement recipient, one or more questions or prompts to receive additional information, from the advertisement recipient, related to the advertisement. In further features, the method still further includes the step of logging input received from the advertisement recipient in response to the one or more questions or prompts; and the method further includes the step of utilizing the logged input to take one or more of the following actions: audit ad effectiveness, set pricing, or trigger enhanced billing.

Broadly defined, the present invention according to another aspect is a system for validating an advertisement presented to a user via a mobile communication device, including: a mobile communication device; an advertising management server; and software installed in the mobile communication device and the advertising management server for causing a mobile communication device and/or an advertising management server to perform an advertisement validation function including: presenting an advertisement for a product or service to an advertisement recipient via a mobile communication device, for some duration thereafter, monitoring at least a portion of the interaction of the advertisement recipient with the mobile communication device relative to some predetermined criteria, and inferring information about the reaction of the advertisement recipient to the advertisement on the basis of the monitored recipient interaction information.

Broadly defined, the present invention according to another aspect is software stored on a computer readable medium for causing a mobile communication device and/or an advertising management server to perform an advertisement validation function including: presenting an advertisement for a product or service to an advertisement recipient via a mobile communication device; for some duration thereafter, monitoring at least a portion of the interaction of the advertisement recipient with the mobile communication device relative to some predetermined criteria; and inferring information about the reaction of the advertisement recipient to the advertisement on the basis of the monitored recipient interaction information.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
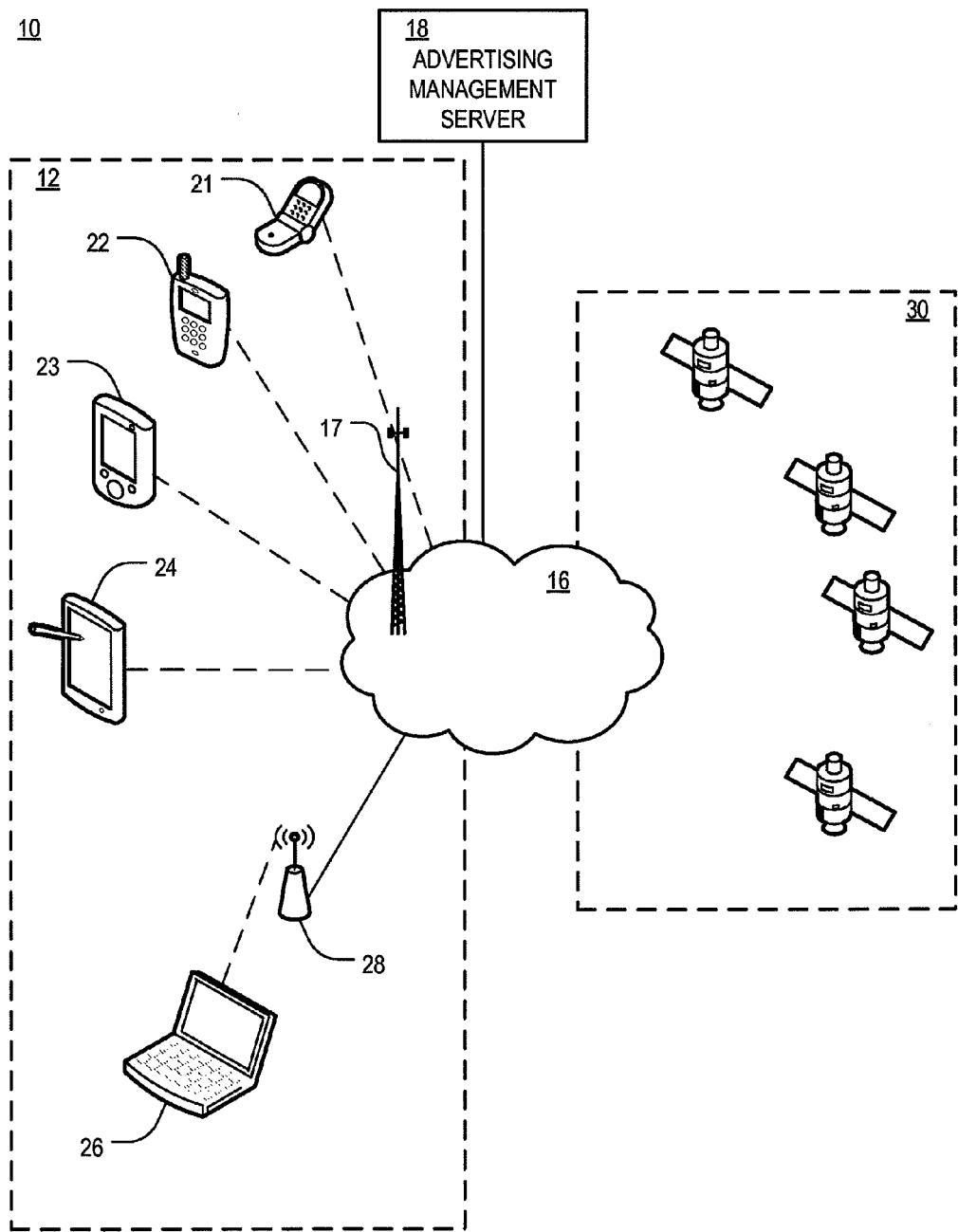
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes a mobile communication device 12, one or more network systems 16 for connecting the communication device 12 to other communication devices (not shown), and an advertising management system, including an advertising management server 18, that preferably includes a speech engine (not shown). Mobile communication devices 12 may include cell phones 21, smart phones 22, PDAs 23, tablet notebooks 24, laptop computers 26, and the like. One or more of the devices 12, such as the illustrated cell phones 21, smart phones 22, PDAs 23, and the like, may connect to the network systems 16 via a cell tower 17 or the like. Further, one or more of the devices 12, such as the illustrated laptop computer 26, may connect to the network systems 16 via wireless access point 28. The various devices 12 may be of any conventional design and manufacture so long as means is provided, such as a GPS receiver, to enable the location of the mobile communication device 12 to be tracked.

The system 10 also preferably utilizes a conventional tracking system 30, which in at least one embodiment makes use of a satellite navigation system like the Global Positioning System ("GPS"). It will be apparent, however, that other technologies, such as tower location systems, access point location mechanisms, or even manual input by a respective user may alternatively or additionally be used to carry out this function. In this regard, however, it will be appreciated that depending solely on manually-input location information may not be preferred because one or more users may not enter locations with sufficient frequency, accuracy, or the like to make it possible to consistently or effectively derive geospatial information about the location of the mobile communication device 12 and its proximity to the locations of advertised products or services.

It will be appreciated that the illustration of FIG. 1 is intended primarily to provide context in which the inventive features of the present invention may be placed. A more complete explanation of one or more system architectures implementing such a system 10 is provided in the incorporated references and/or appendices as described previously.

The advertising management server 18 or another element of the advertising management system delivers advertisements to one of the mobile communication devices 12 for presentation thereby to a person (a "user" or "advertisement recipient") using such device 12. Such presentation may occur via text, graphical display, video, audio, or any other suitable presentation format or media for an advertisement. The advertisements may pertain to a specific location for the business or other entity responsible for the advertisement, or they may pertain generally to a business or other entity having multiple locations. Each such location may sometimes be referred to hereinbelow as a "targeted location." In either case, each of the advertisements is associated with geospatial location information such as one or more address, zip code, set of geographical coordinates, or the like; however, such location information may or may not be presented or otherwise included in the advertisements themselves. More particularly, such geospatial location information is carried with the advertisement data itself, though it may or may not be specifically presented to the user. In some embodiments, the user views the advertisement immediately. Additionally or alternatively, in some embodiments, the advertisement is stored in the memory of the mobile communication device 12 such that it may be viewed by the user at a subsequent time.

The advertising management system maintains one or more database in which advertisements are associated, either directly or via identifiers, with the geospatial location information corresponding therewith. The database may be maintained in the advertising management server 18, across individual mobile communication devices 12, or the like. A separate table of advertisement information and geospatial location information may be maintained for each device 12, or all advertisement information and geospatial location information may be collected in a single table. Such information may be maintained only for recently-downloaded or recently-displayed advertisements, for all advertisements, or for advertisements downloaded or displayed within any desired time period, all subject to storage limitations. Those entries to which user behavior is to be correlated may be referred to as "active" entries.

Additional information is preferably also maintained in association with each advertisement entry. For example, if an advertisement corresponding to a particular entry is displayed or otherwise presented by a mobile communication device 12, then an indication of such occurrence, preferably including a timestamp, may be stored in association with the entry. An indication of whether the advertisement was presented immediately after being downloaded to the device 12 or was presented after a delay may likewise be stored in association with the entry. Additional information identifying or describing the business or other entity responsible for the advertisement and/or one or more of the entity's locations may also be stored in association with the entry. Each active entry may be considered to represent one or more potential destinations for a user whose mobile communication device 12 has received the advertisement. If the entries are maintained in the advertising management server 18, some or all of the entries may likewise be maintained within the mobile device 12 itself, particularly if the entries are limited to those pertaining to advertisements that have been downloaded to the particular mobile communication device 12.

After an advertisement has been downloaded to a mobile communication device 12, and preferably after an advertisement has been displayed or otherwise presented via the mobile communication device 12, the location of the mobile communication device 12 is tracked in an attempt to identify and analyze the movement of the device 12 (and thus the user) in response to viewing the advertisement. In at least one embodiment, only a single advertisement is deemed active at any time for a particular mobile communication device 12, and the location of the mobile communication device 12 is tracked only in relation to that advertisement (and, more particularly, with regard to the geospatial location information associated with that advertisement in the database). In at least some embodiments, however, advertisements are downloaded and presented by the mobile communication device 12 on a frequent basis, and thus multiple advertisements are deemed active at any given time. In such embodiments, the location of the mobile communication device 12 is tracked at any given time in relation to multiple advertisements (and, more particularly, with regard to the geospatial location information associated with those advertisements in the database).

The position of a mobile communication device 12 to which a location-associated advertisement has been downloaded, and preferably displayed, may used to infer information about the device user's response to the advertisement in a variety of ways. First, the position of a user's mobile communication device 12 may be used to track the movements of the user relative to one or more locations associated by the advertising management system with the business or the like that is featured in the advertisement. Information of value that may be determined from this analysis may include whether or not the user arrived at or entered such a location, whether the user first moved toward the location before veering away, or the like. For example, if the mobile communication device 12 comes in close proximity to one of the advertised locations, it may be inferred that the user has arrived at or entered the location. If so, a "walk-thru" may be logged for subsequent informational purposes, such as notifying the advertiser of the total number of "walk-thrus" generated from the advertisements.

It will be appreciated that a determination of a mobile communication device's position relative to a particular location may be accomplished mathematically using geographical coordinates for the location of the mobile communication device 12 and for locations corresponding to particular advertisement entries. In some embodiments, this function may be accomplished by the mobile communication device 12, while in other embodiments this function may be accomplished by the advertising management server 18, and in still other embodiments is accomplished by a separate element (not shown), such as an additional server, connected to the advertising management server 18. If the tracking system 30 is a satellite navigation system like GPS, then the location of the mobile communication device 12 may perhaps most conveniently be provided to the location determination element in the form of GPS coordinates (or the like) representing the relatively precise location of the device 12 at a given point in time. Similarly, if the tracking system 30 is a satellite navigation system like GPS, then the location of interest may be stored in the database in the form of GPS coordinates for such location, or may be derived from the geospatial location information stored in the database, with such derivation being carried out by the location determination element or other component of the system. Because GPS coordinates are able to accurately identify or measure location within a few feet, locations in the database are preferably treated as occupying a larger area than is identified by a single set of GPS coordinates. This may be accomplished by defining an area using multiple sets of coordinates, by using a single set of coordinates and defining a radius or the like around the specific point as establishing an area, or the like. Alternatively or additionally, the location of a mobile communication device 12 may be defined as occupying only a particular point, as occupying an area defined as a circle of a given radius around a particular point, or the like.

Even if the user does not visit a targeted location (i.e., a location tied directly to the content of the advertisement), it may still be valuable to know if the user visited a location related indirectly to the content of the advertisement or engaged in another related activity (sometimes referred to herein as a "competing location" or "alternative location"). In at least one embodiment, this may be accomplished by associating the entry for the advertisement with additional information pertaining to other possible destinations of interest, such as locations of competing businesses. In this embodiment, the position of the mobile communication device 12, and thus the user's position, may then be monitored relative to the additional locations of interest as well as the targeted location. In one such approach, the position of a user may be tracked relative to locations of competing businesses or the like. Information of value that may be determined from this analysis may include whether a user arrived at or entered the location of a business of the same type (such as fast food restaurants) as the business featured in the advertisement. For example, it may be valuable to know that after viewing an advertisement for KFC® or Pizza Hut® (two well known fast food restaurant chains), a user visited a Bojangles® location (another well known fast food restaurant), which was not advertised. It may also be useful to determine whether a user first moved toward an advertised or targeted location and then veered off toward a competitive location or moved toward an advertised or targeted location, but then visited a competing location that was located along the same route.

In a related approach, the position of a user or advertisement recipient may be tracked relative to locations of non-competing or indirectly competing businesses or the like. Information of value that may be determined from this analysis may include whether a user arrived at or entered the location of a business of any type after viewing the advertisement. For example, it may be valuable to know that after viewing an advertisement for a concert, a user went to a movie theater or to a restaurant, or that after viewing an advertisement for a fast food restaurant, a user went to a family sit-down restaurant. Once again, it may also be useful to determine whether a user first moved toward an advertised location and then veered off toward a different location.

Figure 2:
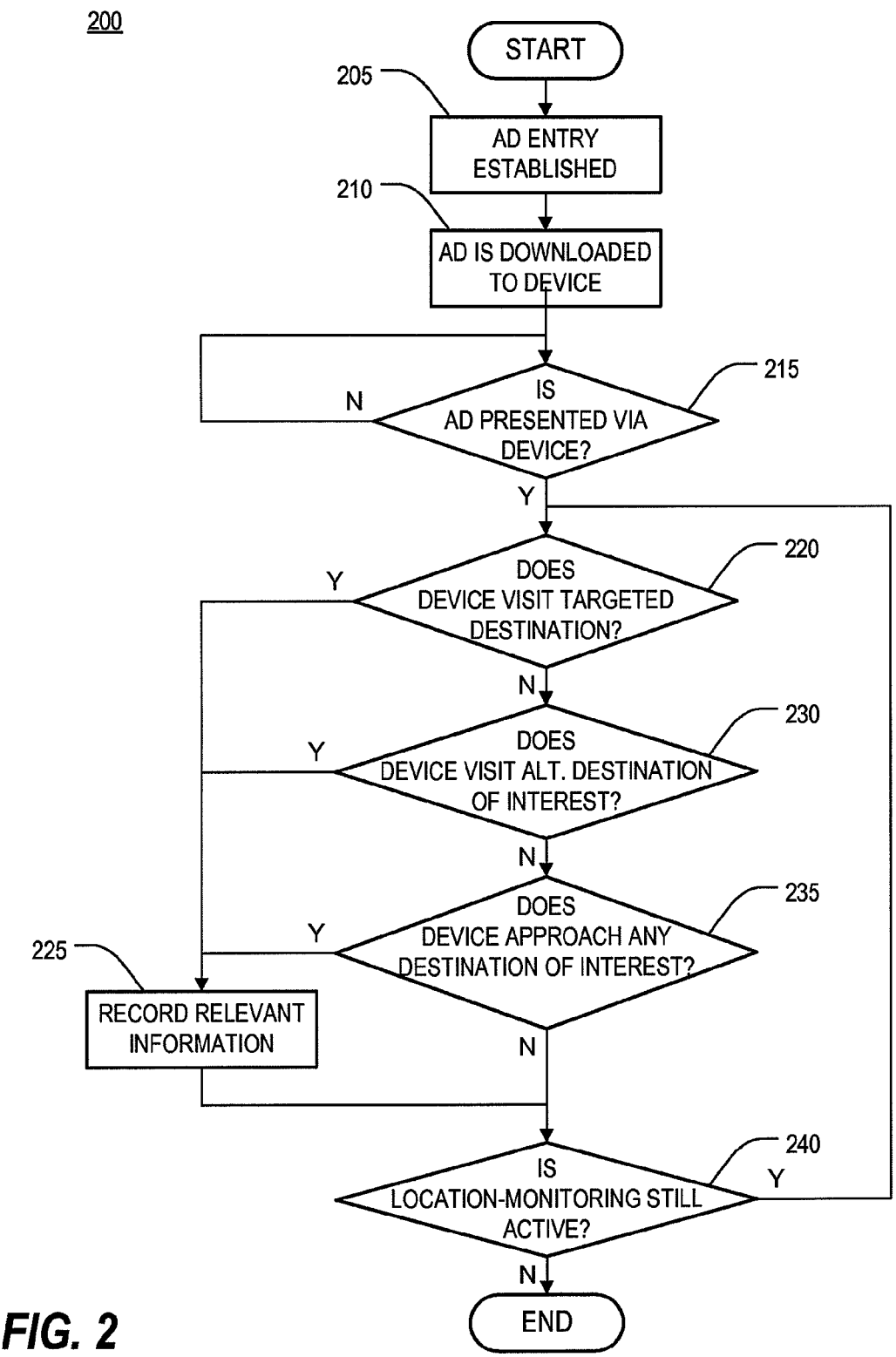
FIG. 2 is a flowchart diagram illustrating a general method of use in accordance with one or more preferred embodiments of the present invention.

FIG. 2 is a flowchart diagram illustrating a general method of use 200 in accordance with one or more preferred embodiments of the present invention. As illustrated therein, after the general method 200 starts, an advertisement entry is established in a database in the advertising management system at step 205. The advertisement entry may be the only entry in the database or it may be one of a plurality of entries in the database. Furthermore, the database may be the only database in the advertising management system or it may be one of a plurality of databases in the advertising management system. Each advertising entry is established by storing advertisement information in association with geospatial location information. The advertisement information may include the advertising content itself, but more likely includes only information identifying the advertisement. Similarly, the geospatial location information may include actual geospatial location information or information identifying the geospatial location information. In one or more anticipated commercial implementations, advertisement entries are established in, and also deleted from, the database on an ongoing basis, so the actual number of advertisement entries in the database varies relatively constantly.

At step 210, the advertisement content corresponding to the advertisement entry is downloaded to a mobile communication device 12. This is shown for example in FIG. 3, which is a schematic representation of a grid 40 of streets 42 on which a vehicle 44, carrying a GPS-equipped mobile communication device 12 such as the cell phone 21 of FIG. 1, is being driven within transmission range of a cell tower 17. More particularly, an advertisement is downloaded to the cell phone 21 by transmission 46 from the cell tower 17. In practice, the advertisement may or may not may be viewed immediately; as noted previously, in some cases the advertisement may be stored for viewing at a later time, while in other cases, there is a delay between the advertisement being downloaded and the actual presentation. Nonetheless, it will be assumed for the purposes of illustration that the advertisement is displayed on the display screen of the cell phone 21 (or otherwise presented to the user) immediately, while the vehicle 44 is in the location shown in FIG. 3. In the process 200 shown in FIG. 2, this is illustrated at step 215.

Figure 3:
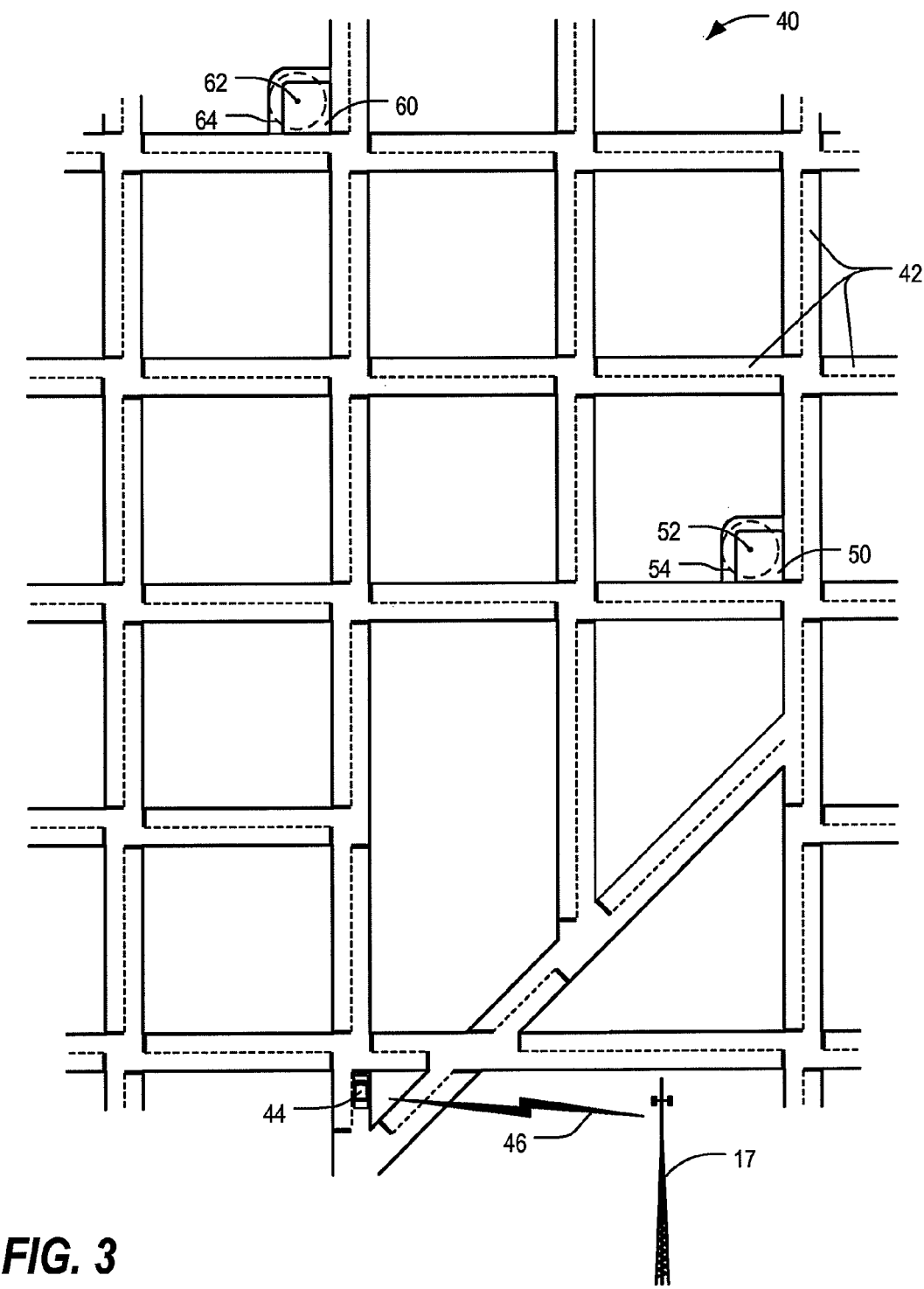
FIG. 3, which is a schematic representation of a grid of streets on which a vehicle, carrying a GPS-equipped mobile communication device such as the cell phone of FIG. 1, is being driven within transmission range of a cell tower.
Figure 4A:
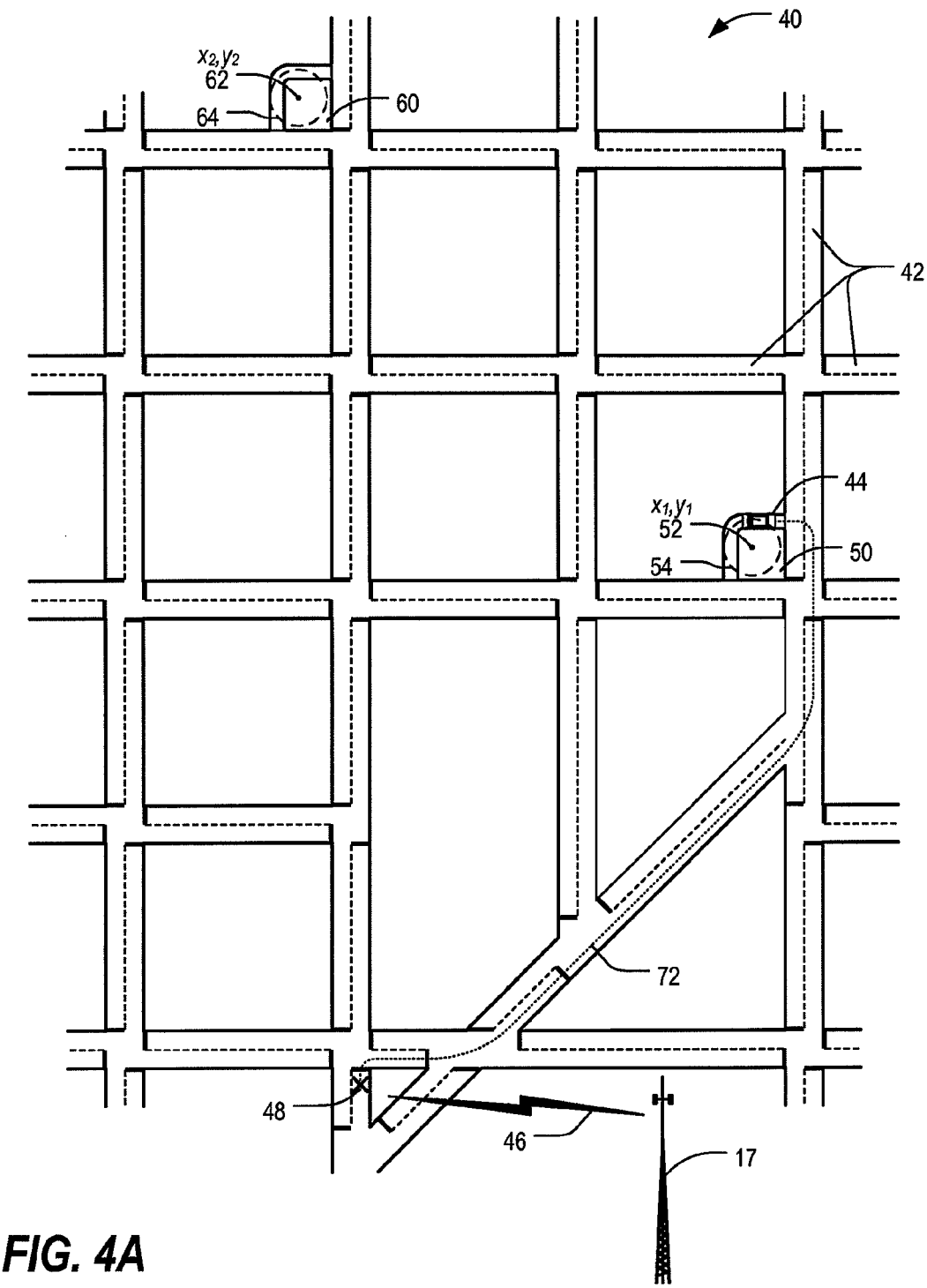
FIG. 4A is a schematic representation of the grid of streets of FIG. 3, showing the vehicle as having traveled to the targeted destination along a first path.
Figure 4B:
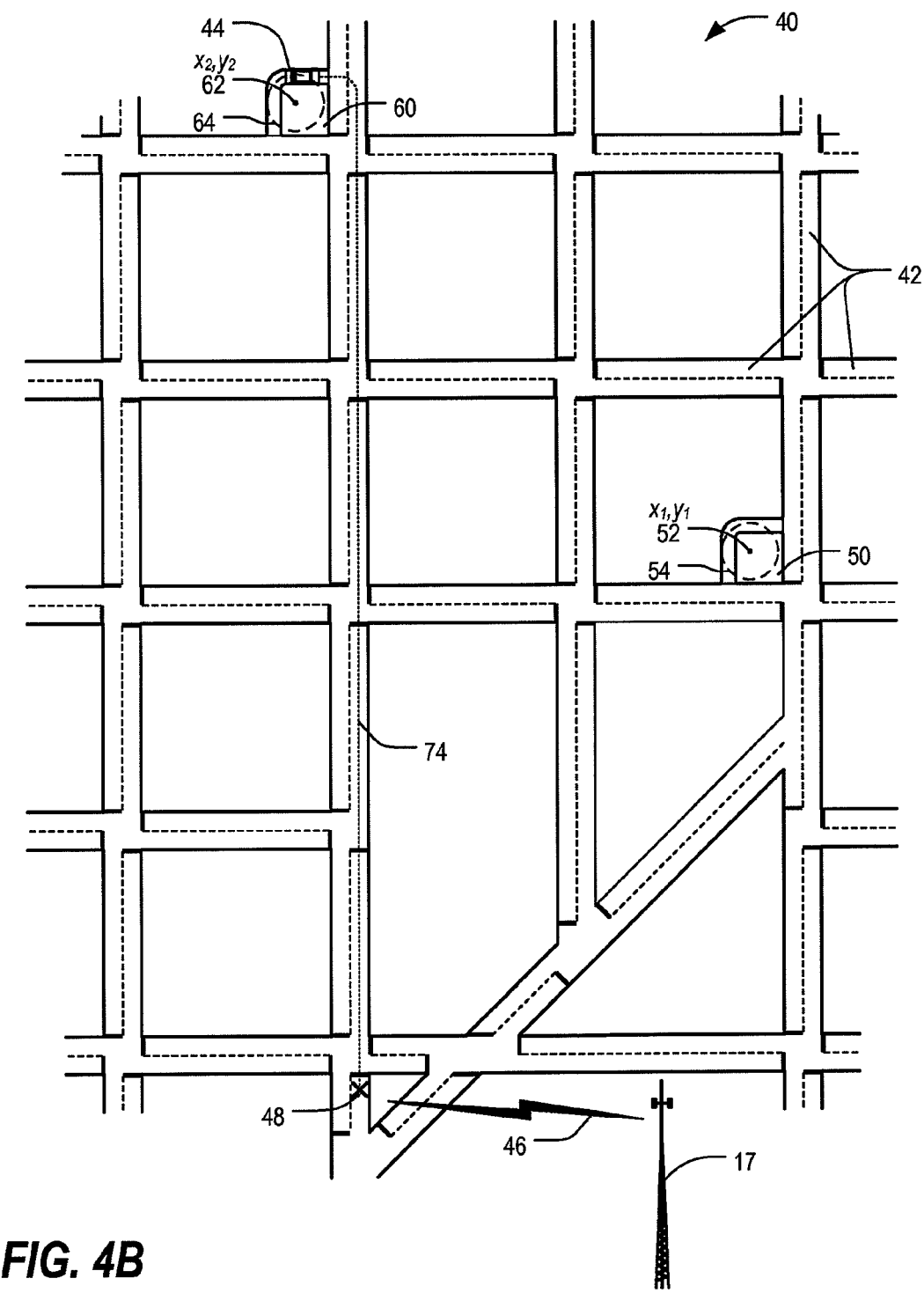
FIG. 4B is a schematic representation of the grid of streets of FIG. 3, showing the vehicle as having traveled to a competing destination along a second path.
Figure 4C:
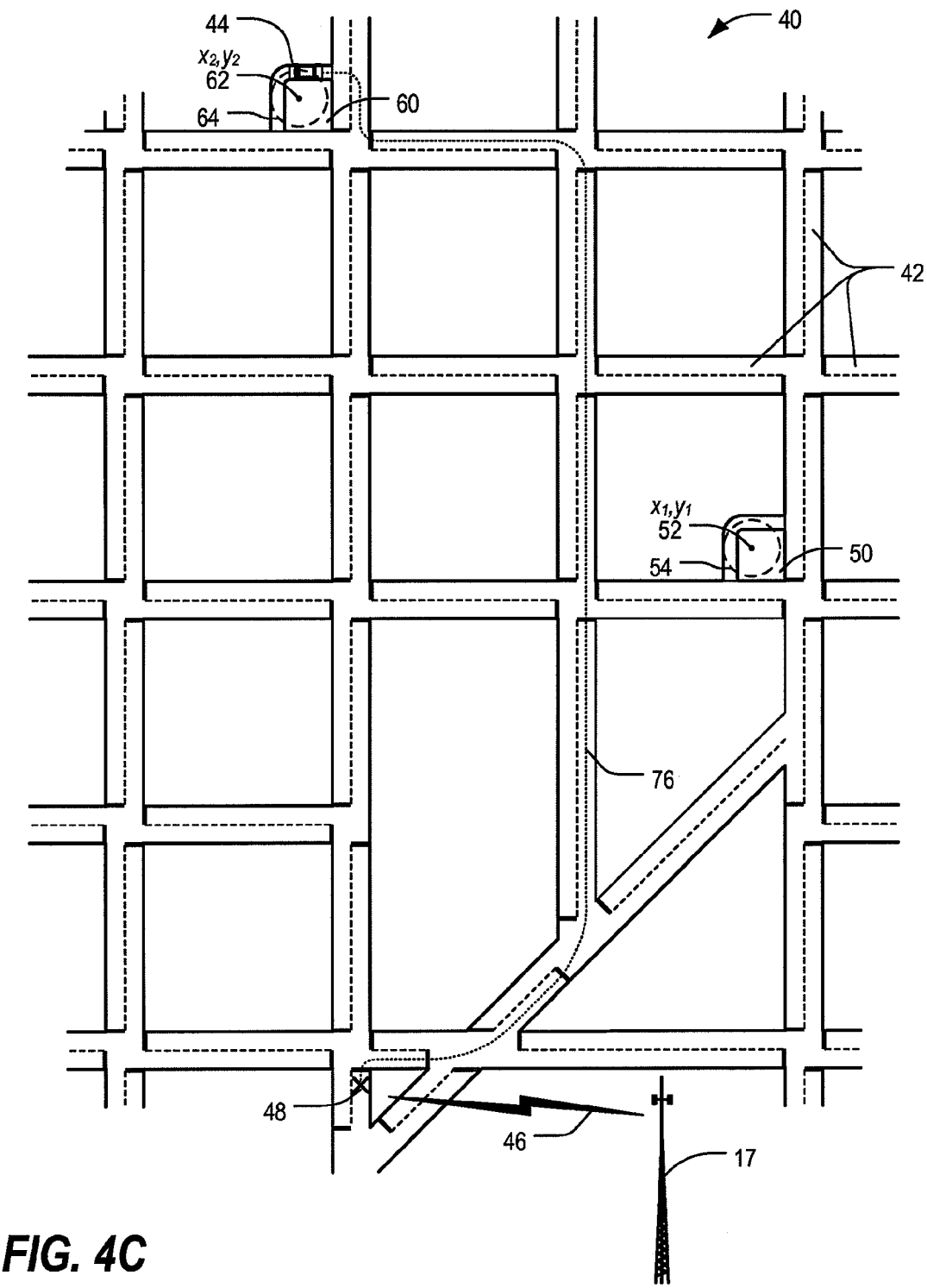
FIG. 4C is a schematic representation of the grid of streets of FIG. 3, showing the vehicle as having traveled toward a targeted destination, along a third path, before traveling to a competing destination.

Once the advertisement has been presented, the location of the mobile communication device 12 is monitored in order to infer the effect of the advertisement on the user. FIGS. 4A-4C are schematic representations of the grid 40 of streets 42 of FIG. 3, showing three exemplary vehicle paths relative to two different possible destinations. In particular, a targeted destination and a competing or other alternative destination is shown, wherein the targeted destination is a destination which the advertiser wishes the advertisement recipient to visit and the alternative destination is a competing destination, a related destination, or other destination of interest. For example, the targeted destination 50 may be a McDonalds® fast food restaurant, while the alternative destination may be a Burger King® fast food restaurant. Each vehicle path represents a different possible outcome occurring after the advertisement is presented to a user traveling in the vehicle 44.

Referring again to FIG. 2, at step 220, it is determined whether the advertisement recipient visited a targeted destination. Such an outcome is illustrated in FIG. 4A, wherein the vehicle 44 is shown as having traveled from its location 48 when the advertisement was downloaded to the targeted destination 50 along a first path 72. The targeted destination 50 has been characterized in the database as a circle 54 whose center 52 has a defined set of coordinates $x_1, y_1$. The circle 54 is large enough, for example, to cover a drive-thru lane around the restaurant. Of course, it will be appreciated that the targeted destination 50 could be characterized more precisely, such as by defining the exact boundaries of the restaurant property. Furthermore, although in the illustrated example, it is assumed that the advertisement recipient remains in the vehicle 44, it will be appreciated that the recipient may instead leave the vehicle and enter the restaurant or the like. The location of the user is generally inferred from that of the mobile communication device 12, regardless of whether the device 12 travels in a vehicle or not. Also, although only one targeted destination is shown in FIG. 4A, it will also be appreciated that there may instead be a plurality of targeted destinations 50.

Returning to FIG. 2, if, at step 220, it is determined that the advertisement recipient has indeed visited a targeted destination 50, then at step 225, a record of this occurrence is recorded in an appropriate database, such as a table in a database of the advertising management system. Such a table may be maintained in the mobile communication device 12, in the server 18, and/or elsewhere in the system. The record preferably includes, at minimum, an indication that an advertisement recipient visited a targeted destination 50 after the particular advertisement was presented. In at least some embodiments, this is defined as a "walk-thru." Additional information that could be recorded includes information (which may be geospatial location information or other information) identifying the particular destination that was visited, the length of time between the presentation of the advertisement and the arrival of the mobile communication device 12 at the targeted location, the length of time between the downloading of the advertisement and the presentation of the advertisement, whether the recipient caused the advertisement to be stored in the device 12, whether the recipient caused the advertisement to be presented more than once, how far the mobile communication device 12 was from the destination 50 when the advertisement was presented to the recipient, and the like.

Alternatively, or in addition, at step 230 it is determined whether the advertisement recipient visited a competitive or other alternative destination. Such an outcome is illustrated in FIG. 4B, wherein the vehicle 44 is shown as having traveled to a competing destination 60 along a second path 74. The alternative destination 60 has been characterized in the database as a circle 64 whose center 62 has a defined set of coordinates $x_2, y_2$. The circle 64 is large enough, for example, to cover a drive-thru lane around the restaurant. As with the targeted destination, it will be appreciated that the alternative destination 60 could be characterized more precisely, such as by defining the exact boundaries of the restaurant property. Furthermore, although in the illustrated example, it is assumed that the advertisement recipient remains in the vehicle 44, it will be appreciated that the recipient may instead leave the vehicle and enter the restaurant or the like. The location of the user is generally inferred from that of the mobile communication device 12, regardless of whether the device 12 travels in a vehicle or not. Also, although only one alternative destination is shown in FIG. 4B, it will also be appreciated that there may instead be a plurality of alternative destinations 60.

Returning to FIG. 2, if, at step 230, it is determined that the advertisement recipient has indeed visited an alternative destination 60, then at step 225, a record of this occurrence is recorded in an appropriate database, such as a table in a database of the advertising management system. Such a table may be maintained in the mobile communication device 12, in the server 18, and/or elsewhere in the system. The record preferably includes, at minimum, an indication that an advertisement recipient visited an alternative destination 60 after the particular advertisement was presented. Additional information that could be recorded includes information (which may be geospatial location information or other information) identifying the particular destination that was visited, the length of time between the presentation of the advertisement and the arrival of the mobile communication device 12 at the alternative location, the length of time between the downloading of the advertisement and the presentation of the advertisement, whether the recipient caused the advertisement to be stored in the device 12, whether the recipient caused the advertisement to be presented more than once, how far the mobile communication device 12 was from the alternative destination 60 when the advertisement was presented to the recipient, how far the mobile communication device 12 was from the targeted destination 50 when the advertisement was presented to the recipient, and the like.

Alternatively, or in addition, at step 235 it is determined whether the advertisement recipient takes other action relative to a targeted destination and a competitive or other alternative destination. Such an outcome is illustrated in FIG. 4C, wherein the vehicle 44 is shown as having traveled toward a targeted destination 50, along a third path 76, before traveling to a competing destination 60. The targeted destination 50 and the alternative destination 60 have been characterized in the database as described previously with regard to FIGS. 4A and 4B. If it is determined, from locational information provided by the mobile communication device 12, that the advertisement recipient has indeed traveled toward a targeted destination 50 before visiting an alternative destination 60, then at step 225, a record of this occurrence is recorded in an appropriate database, such as a table in a database of the advertising management system. Such a table may be maintained in the mobile communication device 12, in the server 18, and/or elsewhere in the system. The record preferably includes, at minimum, an indication that, after a particular advertisement was presented, an advertisement recipient visited an alternative destination 60 after first traveling toward the targeted destination 50. Such action can be detected by monitoring the path 76 of the mobile communication device 12 and comparing it to an expected route, for example. Additional information that could be recorded includes information (which may be geospatial location information or other information) identifying the particular destination 60 that was visited, information (which may be geospatial location information or other information) identifying the particular targeted destination 50 that the user potentially traveled toward, the length of time between the presentation of the advertisement and the arrival of the mobile communication device 12 at the alternative location 60, the length of time between the downloading of the advertisement and the presentation of the advertisement, whether the recipient caused the advertisement to be stored in the device 12, whether the recipient caused the advertisement to be presented more than once, how far the mobile communication device 12 was from the alternative destination 60 when the advertisement was presented to the recipient, how far the mobile communication device 12 was from the targeted destination 50 when the advertisement was presented to the recipient, and the like.

As shown at step 240, the steps 220-235 of monitoring the location of the mobile communication device 12 and recording relevant information about its movement, particularly relative to targeted or alternative destinations, is continued for as long as location-monitoring remains active for the particular advertisement of interest. For example, a time period of interest may be established for the advertisement such that visits to a particular location within that time period are recorded but visits thereafter are not. Such a time period may be controlled and tuned, for example so as to best correlate to the likely influence of a particular advertisement on the advertisement recipient. Also, it will be appreciated that in practice, multiple advertisements may be active at any given time, and that the location device 12 may thus continue to be tracked, relative to a different advertisement, even after tracking has ceased for a first advertisement.

Of course, it will be appreciated that each of the various steps 215, 220, 230 may be carried out before, after or during the other steps, that one or more of the steps may be omitted altogether, and that other steps, particularly involving the determination of other conditions, may be substituted for one or more thereof.

A wide variety of other conditions may likewise be monitored, sometimes for association with conditions monitored as described hereinabove and sometimes in some isolation therefrom. For example, the user's interactions with the advertisements may be monitored and preprogrammed responses may be provided based on such interactions. Even if the mobile communication device 12 does not support location tracking, or if technical problems prevent such tracking from occurring, it may still be possible to gain information of value pertaining to advertisements that have been delivered to the device 12. For example, at least some mobile communication devices 12 may permit a user to save in an "ad cache," for future use, an advertisement that has already been displayed and viewed. If an advertisement is saved in this manner, it may be inferred that the user had an interest in the advertisement or the subject matter thereof and/or that the user was considering the advertised goods or services. Parameters that may be monitored include the user's interaction with an advertisement relative to time and location (e.g., the time/date the user views the advertisement, the location of the user when the advertisement is viewed, etc.), the user's response to prompts generated by the user's mobile communication device 12 some time after an advertisement was displayed, or any functional steps that the user takes after viewing the advertisement.

Information of value that may be determined with regard to the latter includes inferences about the user's activity based on the functional steps. For example, if the user powers off or mutes his cell phone 21 a relatively short time after viewing an advertisement for a movie showing and then re-enables the cell phone 21 120 minutes later (or whatever the length of the advertised movie was), it may be inferred that the user may have chosen to see a movie and that the movie may have been the advertised one. Further support for such inferences may be found by correlating the power-off/power-on timeframe with movie showtime data.

If advertisements may be saved, as described previously, then additional opportunities are available. Such advertisements may be monitored for subsequent references thereto by the user, and, when they are deleted, the user can be queried relative to the advertisement. For example, at a predetermined period of time after the advertisement was displayed, or when such an advertisement is later deleted from the device 12, the user may be prompted to indicate whether the user used or acted upon the advertisement, and any response provided may be logged. It will be appreciated that such prompts and response-logging may likewise be utilized even if location tracking occurred successfully. Further information of value may be derived by coupling the use of prompts and response monitoring/logging with other user interactions with the advertisements and/or the mobile communication device 12. For example, an advertisement for a movie might be displayed to the user and then moved to the ad cache by the user. Later, the user might refer to it again, perhaps several times as the user checks the movie theater location and show times. If these references take place just before the show time, then it may be possible to infer that the user was interested in the movie and, in fact, may have attended it. When the user deletes the entry from the ad cache, it may be noted that the deletion took place before or after the show, and the user may be prompted with a related simple query, a more complicated script, or any other interactive media, to assess the advertising experience. For example, a script might present the user with a question and possible answers as follows:

"Did you enjoy the movie? [yes] [no] [didn't go] [another time]"

The user's response to such a prompt is logged, and the script may present the user with follow-up questions selected according to the user's response to the initial question and/or the user's response to subsequent questions. In at least some embodiments, the query or script is specific to each type of advertisement and is delivered to the mobile communication device 12 along with the advertisements. There may actually be multiple paths through the entire script that execute differently depending on the user's movements and interaction with the advertising material.

Preferably, the system determines whether the user uses his mobile communication device 12 to call any phone number(s) or view any website(s) related to an advertisement the user has viewed and then logs this information, including the phone number called or the address of each such website visited, as well as the time/date, the length of time spent, and/or the like. If the phone number or website is one provided in the advertisement, this fact is preferably noted, but such determination and logging preferably occurs whether or not the phone number or website address (URL) was provided in the advertisement.

Of significance, some or all of the information determined about the user's interaction with the mobile communication device 12 may be used on its own or may be coupled with geospatial location information determined as set forth hereinabove. Further, in at least one embodiment, the use of non-geospatial information determination techniques may be dependent upon, and supplemental to, the availability of geospatial location information, while in at least one other embodiment, such techniques may be resorted to only in the absence of geospatial location information, depending upon the needs of the advertiser and/or the purveyor of the system.

All of the information derived as described above may be used in various methods for generating advertising revenue and otherwise engaging in more conventional advertising practices. For example, a fee paid by an advertiser to have an advertisement displayed on one or more mobile communication devices 12 may be adjusted based on the number of "walk-thrus" that are logged. User responses to prompts, scripts and the like may be used to audit ad effectiveness, set pricing, trigger enhanced billing (because ads that users respond to physically are worth more), and the like. Even information about user actions that did not result in a "walk-thru" or similar indication of direct user interest in the advertised product or service have value.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A computer-implemented method comprising:
under control of one or more computing devices configured with specific computer-executable instructions,
providing an advertisement for a first item to a mobile communication device, wherein the advertisement is presented on the mobile communication device;
obtaining, from the mobile communication device, interaction information indicating that a user of the mobile communication device selected the advertisement to be stored in an advertisement cache; and
determining an effectiveness of the advertisement based at least partly on the interaction information.

2. The computer-implemented method of claim 1, wherein the interaction information comprises a reaction of the user to the advertisement.

3. The computer-implemented method of claim 1, further comprising instructing the mobile communication device to prompt the user regarding whether the advertisement was acted upon.

4. The computer-implemented method of claim 3, further comprising receiving; from the mobile communication device, response information associated with a user response to the prompt, wherein the effectiveness of the advertisement is further determined based at least partly on the response information.

5. The computer-implemented method of claim 3, wherein instructing the mobile communication device to prompt the user is performed in response to receiving, from the mobile communication device, an indication that the advertisement was deleted from the advertisement cache.

6. The computer-implemented method of claim 1, wherein:
the interaction information further comprises information regarding at least one of:
a period of time that the advertisement is stored;
a number of times the user viewed the advertisement stored in the advertisement cache; and
whether the user manually deleted the advertisement from the advertisement cache.

7. The computer-implemented method of claim 1, wherein:
the interaction information further indicates a number of times the user viewed the advertisement stored in the advertisement cache; and
the effectiveness of the advertisement is based at least partly on the number of times the user viewed the advertisement stored in the advertisement cache.

8. A system comprising:
an electronic data store configured to store an advertisement for an item; and
one or more computing devices in communication with the electronic data store, the one or more computing devices configured to at least:
provide the advertisement to a mobile communication device, wherein the advertisement is presented on the mobile communication device;
obtain, from the mobile communication device, interaction information regarding an interaction of a user with the mobile communication device subsequent to presentation of the advertisement, the interaction corresponding to use of a function of the mobile communication device independent of presentation of the advertisement; and
determine a reaction of the user to the advertisement based at least partly on the interaction information.

9. The system of claim 8, wherein the one or more computing devices are further configured to instruct the mobile communication device to at least prompt the user, after a predetermined period of time, to indicate whether the advertisement was acted upon.

10. The system of claim 8, wherein determining the reaction of the user comprises determining that the user purchased the item.

11. The system of claim 8, wherein the advertisement relates to an activity, and wherein the interaction information comprises at least one of:
an indication that the user deactivated the mobile communication device for a duration of the activity; or
an indication that the user muted an audio output of the mobile communication device for a duration of the activity.

12. The system of claim 11, wherein the activity comprises a movie showing, and wherein the determined reaction of the user comprises attendance at the movie showing.

13. The system of claim 8, wherein the interaction information comprises an indication that the mobile communication device was used to initiate communication with contact information related to the advertisement.

14. The system of claim 8, wherein the one or more computing devices are further configured to instruct the mobile communication device to prompt the user for additional information related to the advertisement.

15. The system of claim 14, wherein the one or more computing devices are further configured to store information received from the mobile communication device in response to the prompt.

16. The system of claim 15, wherein the one or more computing devices are further configured to at least one of:
set a price for the item based at least partly on the stored information;
initiate enhanced billing for the item based at least partly on the stored information; or
perform an effectiveness audit for the advertisement.

17. The system of claim 8, wherein the function of the mobile communication device independent of the presentation of the advertisement is at least one of deactivating the mobile communication device or muting an audio output of the mobile communication device.

18. A non-transitory computer-readable medium storing computer executable instructions that, when executed by one or more computer systems, configure the one or more computer systems to perform operations comprising:
providing an advertisement for a first item to a mobile communication device, wherein the advertisement is presented on the mobile communication device;
obtaining, from the mobile communication device, interaction information regarding an interaction of a user with the mobile communication device subsequent to presentation of the advertisement, the interaction corresponding to use of a function of the mobile communication device independent of presentation of the advertisement; and
determining a reaction of the user to the advertisement based at least partly on the interaction information.

19. The non-transitory computer-readable medium of claim 18 wherein the operations further comprise obtaining location information for the mobile communication device.

20. The non-transitory computer-readable medium of claim 19, wherein the interaction information comprises an indication of an interaction of the user with the mobile communication device relative to the location information for the mobile communication device.

21. The non-transitory computer-readable medium of claim 18, wherein the operations further comprise causing the mobile communications device to prompt the user, after a predetermined period of time, to indicate whether the advertisement was acted upon.

22. The non-transitory computer-readable medium of claim 18, wherein the interaction information comprises an indication that the user purchased the item in response to observing the advertisement.

23. The non-transitory computer-readable medium of claim 18, wherein the advertisement relates to an activity, and wherein the interaction information comprises at least one of:
an indication that the user deactivated the mobile communication device for a duration of the activity; or
an indication that the user muted an audio output of the mobile communication device for a duration of the activity.

24. The non-transitory computer-readable medium of claim 23, wherein the activity comprises a movie showing, and wherein the determined reaction of the user comprises attending the movie showing.

25. The non-transitory computer-readable medium of claim 18, wherein the interaction data comprises an indication that the mobile communication device was used to initiate communication with contact information related to the advertisement.

* * * * *